United States Patent
Mital et al.

(10) Patent No.: US 11,264,012 B2
(45) Date of Patent: Mar. 1, 2022

(54) NETWORK TOPOLOGY DETERMINATION AND CONFIGURATION FROM AGGREGATED SENTIMENT INDICATORS

(71) Applicant: Avaya Inc., Santa Clara, CA (US)

(72) Inventors: Piyush Mital, Thane West (IN); Nikita Kotak, Pune (IN); Asmita Gokhale, Pune (IN); Robert E. Braudes, Erie, CO (US)

(73) Assignee: Avaya Inc., Santa Clara, CA (US)

( * ) Notice: Subject to any disclaimer, the term of this patent is extended or adjusted under 35 U.S.C. 154(b) by 226 days.

(21) Appl. No.: 16/731,542

(22) Filed: Dec. 31, 2019

(65) Prior Publication Data

US 2021/0201897 A1 Jul. 1, 2021

(51) Int. Cl.
| | | |
|---|---|---|
| G10L 15/00 | (2013.01) |
| G10L 15/26 | (2006.01) |
| G10L 15/18 | (2013.01) |
| H04L 51/00 | (2022.01) |
| G10L 15/22 | (2006.01) |
| G06K 9/00 | (2022.01) |
| G10L 25/63 | (2013.01) |
| H04L 41/0806 | (2022.01) |
| H04L 41/12 | (2022.01) |

(52) U.S. Cl.
CPC ...... *G10L 15/1815* (2013.01); *G06K 9/00302* (2013.01); *G06K 9/00335* (2013.01); *G10L 15/22* (2013.01); *G10L 25/63* (2013.01); *H04L 51/16* (2013.01); *G10L 2015/223* (2013.01); *H04L 41/0806* (2013.01); *H04L 41/12* (2013.01)

(58) Field of Classification Search
CPC .............. G06F 40/30; G06K 9/00302; G06K 9/00335; G10L 15/1815; G10L 15/22; G10L 15/26; G10L 2015/223; G10L 25/63; H04L 41/0806; H04L 41/12; H04L 51/16
USPC ....................................... 704/235
See application file for complete search history.

(56) References Cited

U.S. PATENT DOCUMENTS

| | | | | |
|---|---|---|---|---|
| 8,145,482 B2* | 3/2012 | Daya | ...................... | G10L 15/063 704/236 |
| 8,170,872 B2* | 5/2012 | Lyle | ...................... | G06Q 10/107 704/235 |

(Continued)

FOREIGN PATENT DOCUMENTS

CA 2751872 3/2012

OTHER PUBLICATIONS

Morse et al. "We can use colour to communicate how we feel—here's how," The Conversation US, Inc., Jan. 22, 2018, 7 pages [retrieved online from: theconversation.com/we-can-use-colour-to-communicate-how-we-feel-heres-how-90157].

*Primary Examiner* — Khai N. Nguyen
(74) *Attorney, Agent, or Firm* — Sheridan Ross P.C.

(57) ABSTRACT

Conversations between agents of a contact center and a customer are often transcribed so that text is maintained. However, text conversations consist only of text and omit significant portions of a conversation that are conveyed outside of the specific words spoken. By determining the emotion, tone, or other aspect in a conversation, which may contradict the text content, a data structure may be maintained such that the textual content is annotated with emotion or tonal information and/or utilized in a routing decision to cause a communication network to be altered, such as to include at least one additional node based upon a particular emotion or tone.

20 Claims, 4 Drawing Sheets

(56) References Cited

U.S. PATENT DOCUMENTS

| | | | |
|---|---|---|---|
| 8,457,964 B2 | 6/2013 | Jaiswal | |
| 8,634,543 B2 | 1/2014 | Flockhart et al. | |
| 9,047,871 B2* | 6/2015 | Dimitriadis | G10L 25/63 |
| 9,105,042 B2* | 8/2015 | Sylves | G06Q 10/06395 |
| 9,413,891 B2* | 8/2016 | Dwyer | H04M 3/42221 |
| 9,891,792 B1* | 2/2018 | Morin | G06F 16/285 |
| 10,418,035 B1* | 9/2019 | Johnson | G06Q 30/016 |
| 10,832,009 B2* | 11/2020 | Bonin | G06N 5/045 |
| 11,005,995 B2* | 5/2021 | Weisman | H04M 3/5175 |
| 2008/0189171 A1* | 8/2008 | Wasserblat | G06Q 10/06398 |
| | | | 705/7.32 |
| 2009/0292541 A1* | 11/2009 | Daya | G10L 15/063 |
| | | | 704/251 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2014/0143157 A1* | 5/2014 | Jeffs | H04M 3/5175 |
| | | | 705/304 |
| 2014/0163960 A1* | 6/2014 | Dimitriadis | G10L 25/48 |
| | | | 704/9 |
| 2014/0220526 A1* | 8/2014 | Sylves | G06Q 30/0201 |
| | | | 434/238 |
| 2015/0195406 A1* | 7/2015 | Dwyer | G10L 15/26 |
| | | | 379/265.07 |
| 2015/0332088 A1 | 11/2015 | Chembula | |
| 2017/0250931 A1* | 8/2017 | Ioannou | H04L 67/2833 |
| 2018/0226071 A1* | 8/2018 | Winter | H04M 3/5183 |
| 2019/0005027 A1* | 1/2019 | He | G06N 20/00 |
| 2019/0034963 A1* | 1/2019 | George | G06Q 30/0246 |
| 2019/0251578 A1* | 8/2019 | Blanchet | G06Q 30/02 |
| 2019/0253558 A1* | 8/2019 | Haukioja | G10L 15/22 |
| 2019/0385256 A1* | 12/2019 | Nahamoo | G06F 16/27 |
| 2020/0195779 A1* | 6/2020 | Weisman | G10L 15/1807 |
| 2021/0081293 A1* | 3/2021 | Sahni | G06N 20/20 |
| 2021/0081972 A1* | 3/2021 | Sahni | G06Q 30/0203 |
| 2021/0126999 A1* | 4/2021 | Sachdev | H04M 1/72436 |
| 2021/0201897 A1* | 7/2021 | Mital | G10L 15/22 |

* cited by examiner

NETWORK TOPOLOGY DETERMINATION AND CONFIGURATION FROM AGGREGATED SENTIMENT INDICATORS

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for networking nodes on a network and particularly to determining a preferred configuration to produce a particular network topology.

BACKGROUND

During any conversation, say a meeting or a customer feedback, the speech may be transcribed as an aid to understanding the dialogue flow and to memorialize the conversation for later use. When speech is converted into text, the audio is lost and any content not explicitly spoken is also lost. As a result, relevant information may be omitted from a text transcript of the spoken content.

SUMMARY

In a text-only transcript of spoken content, any emotional content may not be represented or may be inaccurately represented. As a result, the emotions associated with the conversation are disregarded. Subsequent utilization of the text record may rely on analyzers that work on the text alone in order to retrieve the emotions or sentiments. It would improve the accuracy and usability of transcripts and speech recognition if emotion were detected and captured for incorporation in to the record. For example, emotions originally presented in the speech and/or facial expressions of the speaker should also be incorporated into the analysis of a conversation. For example, sarcasm and rhetorical questions, if not correctly identified as such, may provide a very different and incorrect record of the speech.

Consider an example from a customer feedback, "You're doing an amazing job". Here the sentiment and tone analysis of the text will be positive and give positive results, but it is possible that the statement was spoken in a neutral fashion. Additionally, the facial expressions could be portraying anger. Relying on just one metric (e.g., text) amongst many can lead to false positives in emotion recognition. However, if more or all metrics (e.g., sentiment within the text, tone analysis of textual data, voice tone, facial expression, etc.) are included, a more accurate and complete understanding may be provided.

In one embodiment, the speech from a conversation between a customer and an agent can be converted to text, which can be translated further if required. Additionally, information may be extracted from the voice data and/or video captured of one or more of the participants in the conversation or from an analysis of the voice data. This information may include a determination and presentation of intent, sentiment, or topic analysis, such as presenting a cluster of related topics. In a further embodiment, color, emoticons, and/or transcript enhancements may be utilized to preserve such information for subsequent use or reference.

In one example, text is accessed that comprises: "You are so hardworking, we should give you a raise". Here, the sentiment analysis of the sentence would give us a positive output and the speech analysis could provide a neutral output. The color or other indicia may be chosen based on the combination of the outputs. Additionally or alternatively, the facial expressions of the speaker would be used to select a face emoticon which would finally be filled with the above selected color. As a result, a more complete representation may be provided with both textual sentiments and intents as well as colored emoticons which would help us to clearly understand the discrepancies (if any) in the emotions portrayed by different modes of communication in any given conversation.

In one embodiment, the process steps may be provided that include:

1. Speech-to-text conversion of real-time or recorded audio.
2. Text analysis: the text transcription is passed through the sentiment and/or tone analyzers.
   a. Sentiment analysis: sentiment of the text is calculated, such as on a scale of −1 to 1 to indicates a sentiment on a scale that varies from negative to positive, respectively.
   b. Textual tone analysis: the text is categorized, such as into one of 7 different tones available (e.g., confidence, joy, tentative, analytical, sadness, anger and fear) which may be further determine based on a magnitude.
3. Voice tone analysis: the audio is classified, such as into one of 5 tones (e.g., happy, neutral, sad, angry and fear).
4. The output of the three analyzers is then encoded as an indicia, such as a color assigner for color encoding.
5. Facial expression analysis: the facial expressions are analyzed and encoded, such as with a face emoticon selected in accordance with the determined facial expression. For example, if the facial expression shows anger, the angry face emoticon is selected.
6. Next, the output including the intents, sentiments, and indicia, such as a rendering of an emoticon containing an appropriate facial expression selected by the system with an assigned color, is output. The output may be an input to further processing, routing of a particular communication, inclusion of additional nodes in a communication, or displayed for use by a user.
7. Indications of the correctness or incorrectness may be determined or received and utilized as a training datum for a machine learning algorithm utilized to make subsequent determinations of emotion and/or sentiment.

These and other needs are addressed by the various embodiments and configurations of the present invention. The present invention can provide a number of advantages depending on the particular configuration. These and other advantages will be apparent from the disclosure of the invention(s) contained herein.

In one embodiment, a system is disclosed, comprising: a network interface to a network; a data storage, wherein the data storage is a non-transitory data storage; a microprocessor;

wherein the microprocessor performs: accessing a conversation between an agent and a customer, wherein the conversation is conducted via the network and each of a first communication device and a second communication device, each attached to the network and utilized by the agent and customer, respectively and wherein the conversation comprises a textual portion, consisting of the words vocalized, and a non-text portion; determining a text sentiment from at least one word of the text transcript having a sentiment associated therewith in accordance with a first rule; determining a secondary sentiment from the non-text portion in accordance with a second rule; upon determining the secondary sentiment does not contradict the text sentiment, assigning the text sentiment as an aggregate sentiment; upon determining the secondary sentiment does contradict the text sentiment, assigning the secondary sentiment as the aggregate sentiment; and populating a data structure with the aggregate sentiment, wherein the data structure is further associated with the text transcript, and causing the aggregate sentiment to be stored in the data storage.

In another embodiment, a method is disclosed, comprising: accessing a conversation between an agent and a customer, wherein the conversation is conducted via a network and each of a first communication device and a second communication device, each attached to the network and utilized by the agent and customer, respectively and wherein the conversation comprises a textual portion, consisting of the words vocalized, and a non-text portion; determining a text sentiment from at least one word of the text transcript having a sentiment associated therewith in accordance with a first rule; determining a secondary sentiment from the non-text portion in accordance with a second rule; upon determining the secondary sentiment does not contradict the text sentiment, assigning the text sentiment as an aggregate sentiment; upon determining the secondary sentiment does contradict the text sentiment, assigning the secondary sentiment as the aggregate sentiment; and populating a data structure with the aggregate sentiment, wherein the data structure is further associated with the text transcript, and causing the aggregate sentiment to be stored in a data storage.

In another embodiment, a system is disclosed, comprising: means to access a conversation between an agent and a customer, wherein the conversation is conducted via a network and each of a first communication device and a second communication device, each attached to the network and utilized by the agent and customer, respectively and wherein the conversation comprises a textual portion, consisting of the words vocalized, and a non-text portion; means to determine a text sentiment from at least one word of the text transcript having a sentiment associated therewith in accordance with a first rule; means to determine a secondary sentiment from the non-text portion in accordance with a second rule; upon determining the secondary sentiment does not contradict the text sentiment, means to assign the text sentiment as an aggregate sentiment; upon determining the secondary sentiment does contradict the text sentiment, means to assign the secondary sentiment as the aggregate sentiment; and means to populate a data structure with the aggregate sentiment, wherein the data structure is further associated with the text transcript, and causing the aggregate sentiment to be stored in a data storage.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall rover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
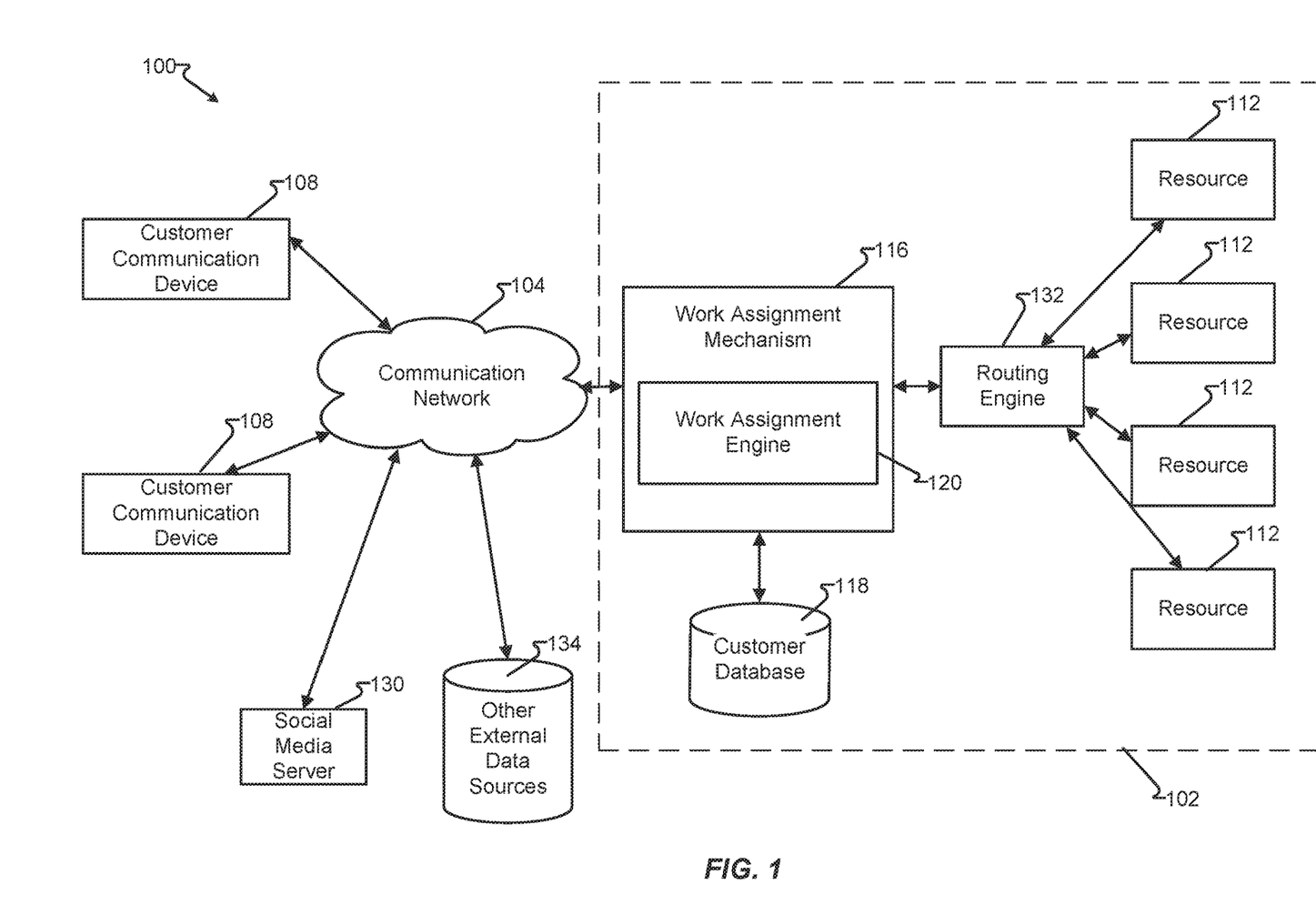
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
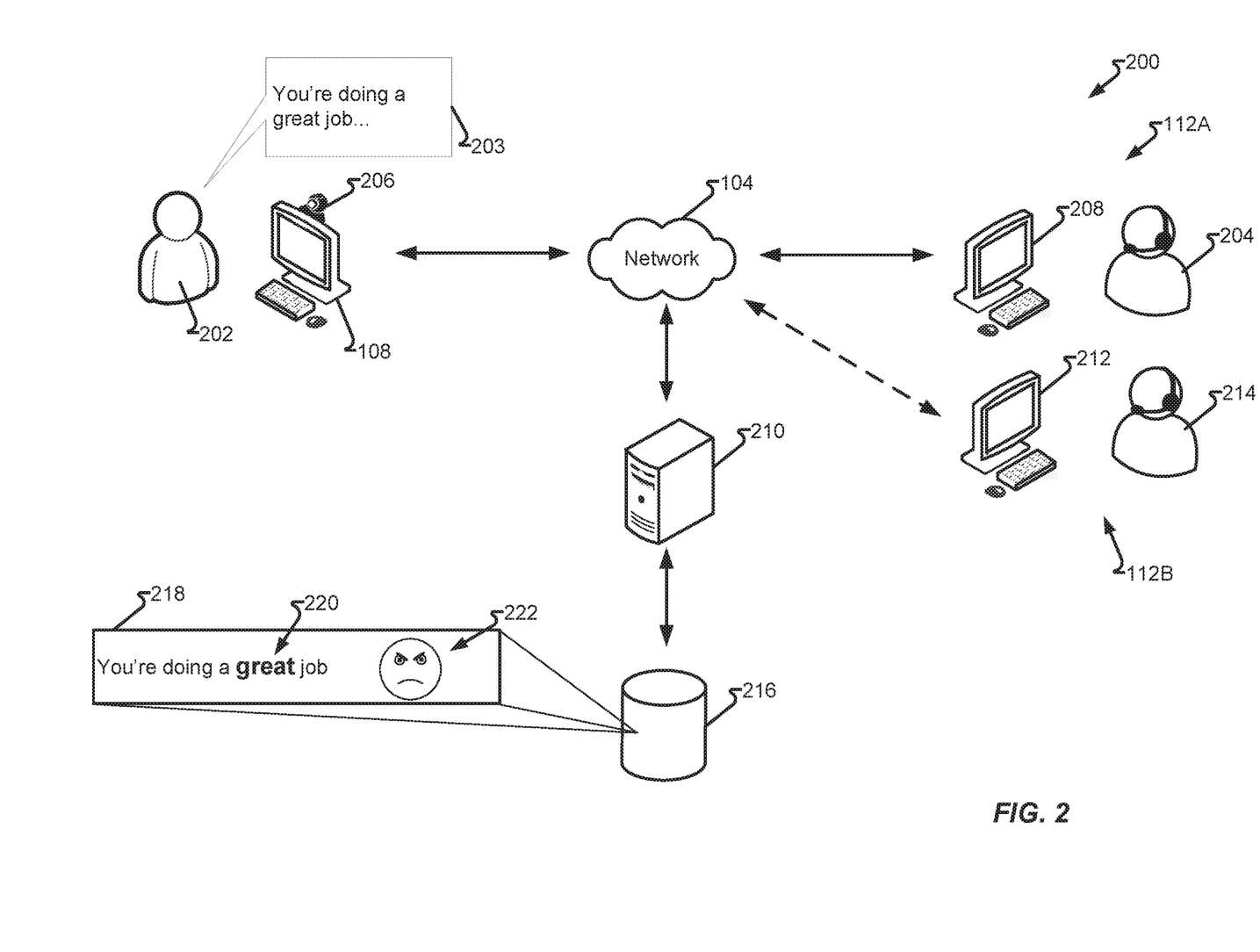
FIG. 2 depicts a second system in accordance with embodiments of the present disclosure.

FIG. 2 depicts system 200 in accordance with embodiments of the present disclosure. In one embodiment, customer 202 is conversing with resource 112A, embodied as agent 204 utilizing agent communication device 208. In another embodiment, resource 112A may be embodied as an automated agent, such as an automated agent conversing with customer 202 utilizing machine-generated speech and speech recognition features. During the conversation between customer 202 and agent 204, customer 202 speaks and thereby provides spoken text, in the form of vocalized words and phrases encoded by customer communication device 108 for transport via communication network 104 to agent communication device 208.

Server 210, agent communication device 208, supervisor communication device 212, and customer communication device 108 each comprise at least one network interface in order to send and receive data via communication network 104, the network interface comprising the configured hardware necessary to support the desired communication protocol(s) and may comprise a network interface card or chip, antenna, physical connection port, logical connection port, etc.

Server 210 is variously embodied and may be a single-purpose server and/or computer, such as a single core microprocessor, multi-core microprocessor, blade, shared computing resource (e.g., array), networked processing appliance, machine-independent shared processor (e.g., "cloud" processor), or combinations thereof. Server 210 may comprise, or be comprised by, one or more of work assignment mechanism 116, work assignment engine 120, routing engine 132, agent communication device 208, and/or other finality. Server 210 monitors the conversation, such as to perform text transcription for storage in data storage 216. Data storage 216 may comprise one or more of on-chip memory, on-bus memory, internal memory (e.g., internal to server 210), external storage or other storage device or appliance comprising one or more non-transitory storage device(s) accessible to the processor of server 210. Additionally or alternatively, server 210 may comprise, incorporate, or control routing equipment, such as to selectively connect nodes to communication network 104 to enable a particular communication therebetween. For example, server 210 may determine to incorporate supervisor communication device 212 and thereby engage supervisor 214 in listen-only mode, whisper mode (e.g., only agent 204 can hear supervisor 214), or fully enable all parties in the conversation to hear and be heard by supervisor 214.

The network topology depicted by system 200 illustrates one topology. It should be appreciated that other topologies may be implemented without departing from the scope of the embodiments described herein. For example, server 210 may be an "edge" device and the first and last point of contact for contact center 102 to communication network 104. Agent communication device 208 and optionally supervisor communication device 212 may utilize communication network 104 via server 210. In another example, one or more of resource 112A and/or resource 112B may connect directly to communication network 104.

The conversation between agent 204 and customer 202 may comprise voice and other forms of communication, for example camera 206 may capture video images of customer 202 and presented on agent communication device 208 and/or processed by server 210, such as to determine emotion from a facial expression or gesture. Additionally or alternatively, the non-textual component of the speech provided by customer 202 may convey emotion. Vocalized tone, inflection, etc., may determine or confirm that spoken content 203 (e.g., "you're doing a great job") conveys a sincere, sarcastic, or other expression. As a result, server 210 may annotate data record 218 directly, or via a data structure associated (e.g., addressed to, addressed by) data record 218. In one embodiment, data record 218 may apply colorization 220 to text within data record 218. It should be appreciated that this document is limited to black and white representations, therefor colorization 220 is illustrated as bold, in one embodiment, but in other embodiments, a particular color is applied to colorization 220. The specific color is previously determined for a particular non-text expression. For example, colorization 220 may be red for angry, green for happy, etc. Therefore, a subsequent review or processing of data record 218 may convey information that would be otherwise absent from the text itself or even contradictory.

In another embodiment, a machine learning instruction may be executed by server 210, such as to "learn" which aggregates of the facial or vocal expressions and textual sentiments combined are more likely than not to have a particular meaning. In a further embodiment, the machine learning instruction may be trained upon an updated dataset; Dataset updated by taking input from agent 204, customer 202, supervisor 214, and/or other party. For example, agent 204 may be engaged in a conversation with customer 202 and receive an indication, such as via whisper message or indicia presented on a display of agent communication device 208, that customer 202 is angry. However, agent 204 may be better able to determine that server 210 has misinterpreted the vocal inflection and/or facial expression of customer 202 and that customer 202 is not angry or has a different emotion (e.g., disappointed, unsure, etc.). Agent 204 will provide feedback which would update the dataset. In one embodiment, a portion of prior (e.g., now concluded) conversations have been determined as having a particular non-text sentiment, such as comprising a particular facial expression, tone of voice, etc. A microprocessor may then evaluate a current non-text sentiment and determine if a match occurs. The match may be subject to a particular criteria, such as more likely to have a particular non-text sentiment than not, matching one non-text sentiment to a higher degree than matching another non-text sentiment, etc.

Accordingly, a text sentiment may be obtained from the text (e.g., the words spoken by customer 202) and a secondary sentiment determined from the non-textual portion (e.g., facial expression, gestures, non-word vocalizations such as tone, pace, timbre, etc.). In one embodiment, the text sentiment may be represented by the words themselves, absent any non-textual element of the conversation. In another embodiment, the secondary sentiment is entirely indifferent to the words spoken, such that any word, when spoken in a particular manner or accompanied by particular facial expressions would have the same secondary sentiment.

An aggregate sentiment may be provided by the combination of the text sentiment and the secondary sentiment. While aggregation may be mathematical, such as a score of "0.3 happy" as determined from the text (e.g., words comprising words and/or sufficient words to indicate a modest degree of happiness and, vocalized tones or expression (e.g., smiling) may have a "0.1 happy" determined therefrom, as a result of mathematical addition, the result maybe "0.4 happy." It should be appreciated that more complex algorithms may be deployed, such as to consider indicating and counter-indicating text and non-text expressions to arrive at an aggregate sentiment.

In another embodiment, the secondary sentiment may override the textual sentiment. Humans are often better at conveying emotional state by means other than the specific words spoken, to the point that the words themselves may be partially or entirely ignored. However, for certain emotions expressed, the words may be further considered. For example, customer 202 may be a customer of an airline for which agent 204 is providing service. Customer 202 may have forgot to collect all of their luggage once they arrived at their destination. While one or more negative emotions may be expressed outside of the words (e.g., angry, disappointed, fearful, etc.) they say specific words indicating that they are very happy, such as to learn that the airline will put their belongings in a taxi and have it brought to their hotel.

Accordingly, the textual content of the conversation may be evaluated in accordance with a first rule, such as of a first set of rules maintained in data storage 216, and the non-text portion may be evaluated in accordance with a second rule, such as of a second set of rules maintained in data storage 216. Optionally, a third rule, of a third set of rules maintained in data storage 216 may evaluate general or specific agreements or contradictions between the result of the first rule and the second rule to determine a final aggregate sentiment. It should be appreciated that the third rule may also be embodied as a single rule comprising the logic of the first and second rules.

The first rule may, for example, access a record of textual content (e.g., words, phrases, idioms, etc.) and their emotional or tonal meaning (e.g., "hate"=angry, high magnitude of disappointment, etc., "like"=happy, low magnitude of appreciation, etc., "road"=neutral, etc.). The second rule may, for example, have specifically tonal signatures that are associated with a particular emotional or tonal state. It should be appreciated that an example of a tonal signature cannot be textually represented in the text of this document, however, one of ordinary skill in the art can appreciate the tonal signatures than would make a statement like, "you're doing a great job" mean the opposite via sarcasm. However, other specifically tonal expressions will be neutral or convey other emotional state. Similarly, an expression may be obverse via camera 206. For example, customer 202 may say, "I understand," but throw up their hands (in a manner that a human would readily understand to be an expression of frustration) to convey a lack of understanding. This may be in addition or alternative to a particular vocalized tone, such as when customer 202 spoke in a neutral manner.

It should also be appreciated that the communication between agent 204 and customer 202 may be a live conversation or recorded and processed, such as by server 210 after the conversation has concluded or with a delay and not yet terminated.

Figure 3:
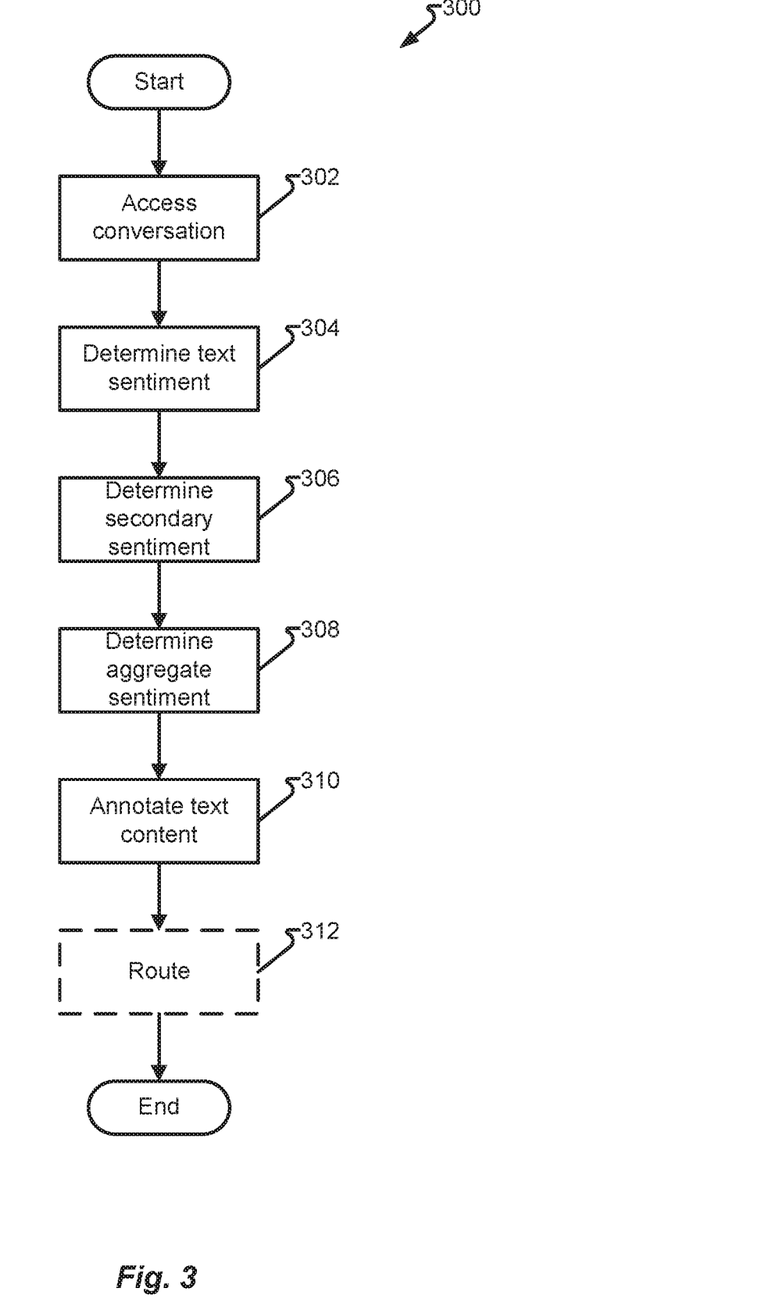
FIG. 3 depicts a process in accordance with embodiments of the present disclosure.

FIG. 3 depicts process 300 in accordance with embodiments of the present disclosure. In one embodiment, process 300 is executed by a processor of server 210, agent communication device 208, and/or other processing device(s). In step 302, a conversation is accessed that comprises customer 202, via customer communication device 108, communicating with agent 204, via agent communication device 208. The communication comprising communication network 104 in at least one of voice (e.g., audio encoding of spoken content) and at least one other communication, which may be non-textual content of the audio (e.g., tone, pitch, timbre, etc.) or a separate encoding (e.g., video). The conversation accessed may be a live, ongoing communication or a delay or after the conversation has been concluded.

A text sentiment is determined in step 304, such as via lookup of a particular word or words and their associated sentiment in data storage 216. Step 306 determines a secondary sentiment, such as by accessing a particular vocalization and its associated sentiment from data storage 216, similarly, a gesture, facial express, or other non-text content of the speech or action provided by customer 202.

Step 308 then determines an aggregate sentiment from each of the text-based sentiment and the secondary sentiment. Aggregate sentiment and/or tone may be determined and/or the magnitude of the particular sentiment and/or tone. Accordingly the text provided may have a more accurate meaning determined than what can be determined from the text alone, such as due to sarcasm, fear, or other emotion, sentiment, tone, etc., that is determined in step 306 and aggregated in step 308. In some embodiments, step 308 may override the sentiment determined in one of step 304 or step 306, based the particular textual content or non-textual content provided. For example, if customer 202 spoke with clenched jaw, as determined by video showing the facial expression or speech analysis determining that the speech was made with a clenched jaw. If customer 202 spoke positive words (e.g., "you're doing a great job.") the sentiment maybe overridden if determine that it was said with a clenched jaw. Similarly, the non-vocalized expression determined in step 306 may be ignored if the communication comprises particular content. As discussed in the example above, customer 202 may be very upset that they forgot a piece of luggage at the airport, and their anger at themselves, frustration, etc., may be determined in step 306, but ignored if the words spoken, as determined in step 304, are complementary, (e.g., "Thank you for helping me." "I appreciate what you're doing," etc.).

In other embodiments, step 308 is more nuanced and resolves a more minor disagreement between the sentiment determined in step 304 and step 306. Accordingly, a mathematical formula or rule may be utilized to determine the aggregate sentiment. The particular rule or algorithm utilized may be determined, in whole or in part, based on the particular content. Additionally or alternatively, a machine learning algorithm may be trained to select the particular rule or algorithm in accordance with prior exposure to the same or similar circumstances.

With the aggregate sentiment determined, step 310 annotates a data structure accordingly. The data structure may be data record 218 comprising text transcript and emoticon 222, colorization 220, or other indicia of the aggregate emotional sentiment. The data structure may be split between the text and the emotion but associated, such as via index, URL, or other indicia that associates the text and aggregate sentiment for a conversation or a portion of a conversation. In another embodiment, step 312 may automatically reconfigure the topology of communication network 104, such as automatically connect supervisor communication device 212, disconnect agent communication device 208, and/or other networking topology change to enable the communication comprising the conversation to utilize alternative nodes.

Figure 4:
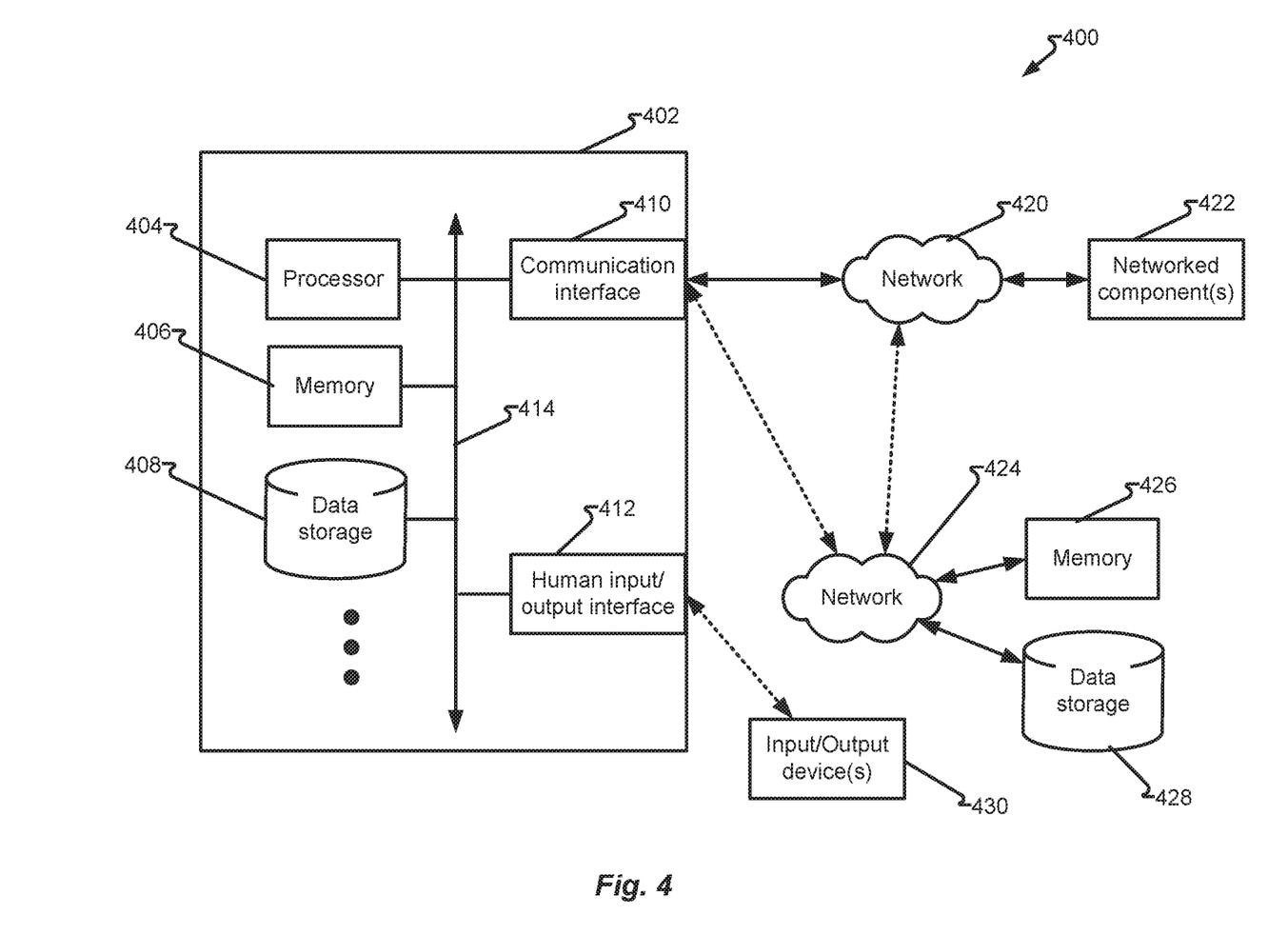
FIG. 4 depicts a third system in accordance with embodiments of the present disclosure.

FIG. 4 depicts device 402 in system 400 in accordance with embodiments of the present disclosure. In one embodiment, customer communication device 108, agent communication device 208, supervisor communication device 212 may be embodied, in whole or in part, as device 402 comprising various components and connections to other components and/or systems. The components are variously embodied and may comprise processor 404. Processor 404 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 414, executes instructions, and outputs data, again such as via bus 414.

In addition to the components of processor 404, device 402 may utilize memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, etc. In another embodiment, communication interface 410 may comprise, or be comprised by, human input/output interface 412. Communication interface 410 may be configured to communicate directly with a networked component or utilize one or more networks, such as network 420 and/or network 424.

Network 104 may be embodied, in whole or in part, as network 420. Network 420 may be a wired network (e.g., Ethernet), wireless (e.g., WiFi, Bluetooth, cellular, etc.) network, or combination thereof and enable device 402 to communicate with network component(s) 422.

Additionally or alternatively, one or more other networks may be utilized. For example, network 424 may represent a second network, which may facilitate communication with components utilized by device 402. For example, network 424 may be an internal network to contact center 102 whereby components are trusted (or at least more so) that networked components 422, which may be connected to network 420 comprising a public network (e.g., Internet) that may not be as trusted. Components attached to network 424 may include memory 426, data storage 428, input/output device(s) 430, and/or other components that may be accessible to processor 404. For example, memory 426 and/or data storage 428 may supplement or supplant memory 406 and/or data storage 408 entirely or for a particular task or purpose. For example, memory 426 and/or data storage 428 may be an external data repository (e.g., server farm, array, "cloud," etc.) and allow device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420.

It should be appreciated that computer readable data may be sent, received, stored, processed, and presented by a variety of components. It should also be appreciated that components illustrated may control other components, whether illustrated herein or otherwise. For example, one input/output device 430 may be a router, switch, port, or other communication component such that a particular output of processor 404 enables (or disables) input/output device 430, which may be associated with network 420 and/or network 424, to allow (or disallow) communications between two or more nodes on network 420 and/or network 424. For example, a connection between one particular customer, using a particular customer communication device 108, may be enabled (or disabled) with a particular networked component 422 and/or particular resource 112, such as an automated resource or agent communication device 208 and agent 204. Similarly, one particular networked component 422 and/or resource 112 may be enabled (or disabled) from communicating with a particular other networked component 422 and/or resource 112, including, in certain embodiments, device 402 or vice versa. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a network interface to a network;
a data storage, wherein the data storage is a non-transitory data storage;
a microprocessor;
wherein the microprocessor performs:
  accessing a conversation between an agent and a customer, wherein the conversation is conducted via the network and each of a first communication device and a second communication device, each being attached to the network and utilized by the agent and customer, respectively, and wherein the conversation comprises a textual portion, consisting of words vocalized in the conversation, and a non-text portion;
  determining a text sentiment from at least one word of a text transcript having a sentiment associated therewith in accordance with a first rule;
  determining a secondary sentiment from the non-text portion in accordance with a second rule;
  upon determining that the secondary sentiment does not contradict the text sentiment, assigning the text sentiment as an aggregate sentiment;
  upon determining that the secondary sentiment does contradict the text sentiment, assigning the secondary sentiment as the aggregate sentiment; and
  populating a data structure with the aggregate sentiment, wherein the data structure is further associated with the text transcript, and causing the aggregate sentiment to be stored in the data storage.

2. The system of claim 1, further comprising the microprocessor performing altering the network to cause the conversation to comprise at least one additional node selected in accordance with the aggregate sentiment.

3. The system of claim 1, wherein the microprocessor performs, upon determining the secondary sentiment does contradict the text sentiment, the assigning the secondary sentiment as the aggregate sentiment, further comprises the microprocessor determining the aggregate sentiment from a third rule utilizing each of the textual and the non-text portions of the conversation and different from both the first rule and the second rule.

4. The system of claim 1, wherein the conversation comprising an ongoing live conversation.

5. The system of claim 1, wherein the conversation comprises a recording of the conversation and wherein accessing the text transcript and accessing the non-text portion are accessed from the data storage.

6. The system of claim 1, wherein the non-text portion comprises an audio of the conversation and vocalizations in addition to speech from which the text transcript is derived.

7. The system of claim 1, wherein the non-text portion comprises a video of the conversation and at least one of facial expressions and gestures of the customer.

8. The system of claim 1, wherein the text sentiment comprises a textual tone determined as a degree of magnitude present in one or more of confidence, joy, tentativeness, analytical, sadness, anger, and fear.

9. The system of claim 1, wherein the secondary sentiment comprises a voice tone determined as a degree of magnitude present in one or more of happy, neutral, sad, angry, and fear.

10. The system of claim 1, wherein the data structure comprises indicia for the aggregate sentiment to apply to the text transcript.

11. The system of claim 10, wherein the indicia comprises a colorization code for the aggregate sentiment.

12. The system of claim 11, wherein the indicia comprises an emoticon for the aggregate sentiment.

13. The system of claim 11, wherein the secondary sentiment is determined by the second rule comprising a machine-learned rule wherein the non-text portion is determined to match a first portion of prior non-text portions previously determined to match the secondary sentiment and not match second portion of prior non-text portions previously determined to not match the secondary sentiment.

14. A method, comprising:
accessing a conversation between an agent and a customer, wherein the conversation is conducted via a network and each of a first communication device and a second communication device, each being attached to the network and utilized by the agent and customer, respectively and wherein the conversation comprises a textual portion, consisting of words vocalized in the conversation, and a non-text portion;
determining a text sentiment from at least one word of a text transcript having a sentiment associated therewith in accordance with a first rule;
determining a secondary sentiment from the non-text portion in accordance with a second rule;
upon determining that the secondary sentiment does not contradict the text sentiment, assigning the text sentiment as an aggregate sentiment;
upon determining that the secondary sentiment does contradict the text sentiment, assigning the secondary sentiment as the aggregate sentiment; and
populating a data structure with the aggregate sentiment, wherein the data structure is further associated with the text transcript, and causing the aggregate sentiment to be stored in a data storage.

15. The method of claim 14, wherein the conversation comprises a recording of the conversation and wherein accessing the text transcript and accessing the non-text portion are accessed from the data storage.

16. The method of claim 14, wherein the non-text portion comprises an audio of the conversation and vocalizations in addition to speech from which the text transcript is derived.

17. The method of claim 14, wherein the non-text portion comprises a video of the conversation and at least one of facial expressions and gestures of the customer.

18. The method of claim 14, wherein the text sentiment comprises a textual tone determined as a degree of magnitude present in one or more of confidence, joy, tentativeness, analytical, sadness, anger, and fear and wherein the secondary sentiment comprises a voice tone determined as a degree of magnitude present in one or more of happy, neutral, sad, angry, and fear.

19. The method of claim 14, wherein the data structure comprises indicia for the aggregate sentiment to apply to the text transcript, and wherein the indicia comprises at least one of a colorization code or an emoticon for the aggregate sentiment.

20. A system, comprising:
- means to access a conversation between an agent and a customer, wherein the conversation is conducted via a network and each of a first communication device and a second communication device, each being attached to the network and utilized by the agent and customer, respectively and wherein the conversation comprises a textual portion, consisting of words vocalized in the conversation, and a non-text portion;
- means to determine a text sentiment from at least one word of a text transcript having a sentiment associated therewith in accordance with a first rule;
- means to determine a secondary sentiment from the non-text portion in accordance with a second rule;
- upon determining that the secondary sentiment does not contradict the text sentiment, means to assign the text sentiment as an aggregate sentiment;
- upon determining that the secondary sentiment does contradict the text sentiment, means to assign the secondary sentiment as the aggregate sentiment; and
- means to populate a data structure with the aggregate sentiment, wherein the data structure is further associated with the text transcript, and causing the aggregate sentiment to be stored in a data storage.

* * * * *